Sept. 21, 1965  L. S. BARNISH  3,207,291
IDLER ROLLERS
Filed Nov. 3, 1961

INVENTOR.
Leonard S. Barnish
BY John L. Shortley
ATTORNEY

United States Patent Office 3,207,291
Patented Sept. 21, 1965

3,207,291
IDLER ROLLERS
Leonard S. Barnish, 260 Market St., Johannesburg,
Transvaal, Republic of South Africa
Filed Nov. 3, 1961, Ser. No. 149,969
3 Claims. (Cl. 198—192)

Many arrangements have been devised to prevent entry of water or dirt into the bearings of an idler roller.

Difficulty has also always been experienced in the cradling of the idler roller. These difficulties and the arrangements for sealing the bearings are too well known to warrant further discussion.

It is an object of the present invention to provide an improved sealing means, and at the same time to provide an improved method of cradling an idler roller.

According to the invention an idler roller comprises a central shaft about which the roller rotates, and a resilient collar detachably secured on the central shaft outside the roller, the collar being adapted lightly to contact the outside end of the roller in sealing relationship.

The collars may be manufactured from rubber, neoprene or other synthetic resin material.

In one form of the invention the portion of the central shaft outside the roller is screw-threaded. The resilient colar is, therefore, firmly held on the shaft. Of course, other formations may be formed on the shaft in order to hold the collar thereon. Alternatively, or in addition, the collar is held in place by a nut on the shaft.

In a preferred form of the invention, the collar is formed with a flange, the edge of which just contacts the end of the roller so that any material which is deposited on the rim of the flange is directed onto the end face of the roller which acts as a "thrower." In the event of any dirt or liquid entering the roller behind the flange, it is arrested in its journey by usual sealing means.

The end of the roller adjacent the flange may be machined to decrease friction.

Further according to the invention the collar is deformed to fit snugly into a cradle, in which it expands to be held firmly.

The cradles are formed in the brackets supporting the idler roller system.

To illustrate the invention an embodiment is described hereunder with reference to the accompanying drawings in which.

Figure 1:
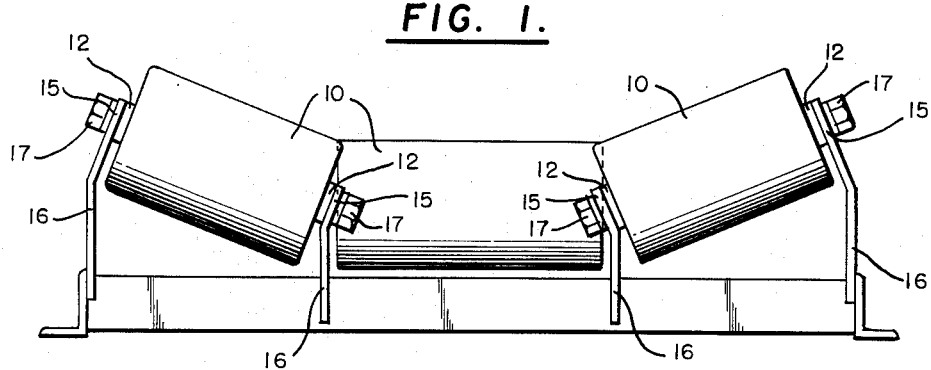
FIGURE 1 is a side view of an idler roller assembly according to the invention.
Figure 3:
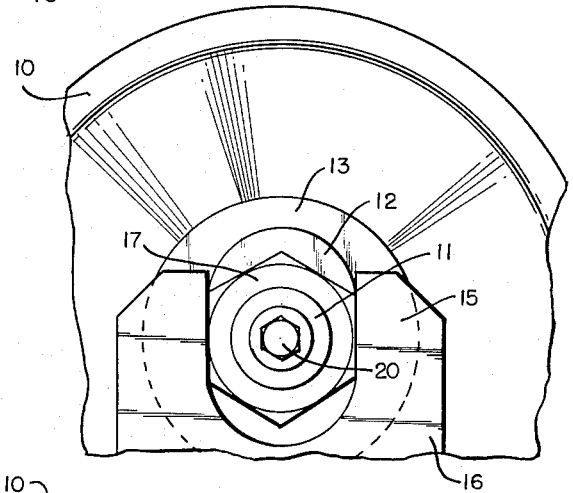
FIGURE 3 is an enlarged view of the end of an idler roller looking from the direction of the arrow 3 in FIGURE 2.
Figure 2:
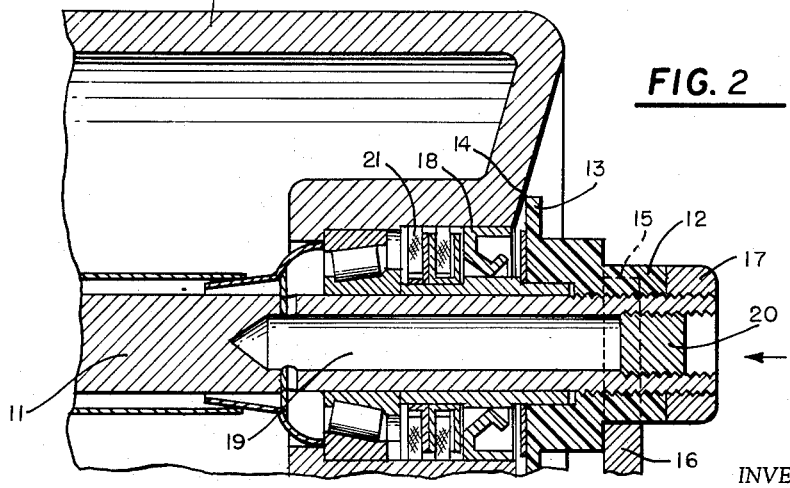
FIGURE 2 is a sectional side view of an idler roller according to the invention with parts cut away.

In the drawings, an idler roller assembly comprises three rollers 10 staggered in plan. Each roller 10 is mounted on a central shaft 11 about which the roller 10 rotates and resilient collars 12 are threaded onto the shaft 11 outside the roller 10, each collar 12 having a flange 13 which just contacts the dished end face of the roller 10 in sealing relationship (in FIGURE 2 the point of contact between the flange 13 and the roller 10 is shown by reference 14), the collars 12 being deformed to fit snugly into U-shaped slots 15 in which they expand to be held firmly, the slots 15 being formed in brackets 16 supporting the idler roller assembly.

The collars 12 may be manufactured from neoprene, rubber or any other synthetic resin material, and their external diameters are slightly greater than the cross-sections of the U-shaped slots 15 so that the collars 12 are required to be deformed in order that they may be inserted into the slots 15. Once the force creating the distortion is released the collars 12 expand to be held firmly. The U-shaped slots 15 are of a tapered construction to ensure that the collars 12 are securely held therein. A nut 17 may be provided to screw onto the shaft 11 outside the collar 12 to prevent the collar 12 from being forced off. Furthermore, when the nuts 17 are screwed up the collars 12 are distorted as a result thereof and their effective diameters increase thus further ensuring a tight fit of the collars 12 in the slots 15.

The flange 13 lightly contacts the dished end face of the roller 10 in sealing relationship and is positioned in such a manner that any material being deposited thereon is directed onto the end face of the roller 10 which acts as a thrower. The danger of any material getting into the roller 10 itself is therefore greatly minimized. If for any reason any material or water does enter behind this flange 13 it is stopped by a single lipped seal 18 which may also be made of neoprene or any other suitable synthetic resin.

A grease duct 19 is provided at each end of each roller 10, and the grease is retained therein by a screw plug 20 which seals the duct 19, a graphited cork labyrinth 21 and the single lipped seal 18. This arrangement ensures that no build-up of pressure is possible.

The two outside rollers 10 are inclined to the horizontal at a predetermined angle, and each is also canted forward a few degrees in order to increase the belt training effect.

One of the big advantages of the invention is that since the rollers themselves are easily removable, unskilled labor can carry out a scheme of preventive maintenance in a minimum time without tools and ensuring that belt alignment is unaffected.

While I have shown and described a preferred form of my invention it will be understood that changes in detail and form may be made by those skilled in the art. Accordingly I claim exclusive right to all forms or modifications coming within the scope of the appended claims.

I claim:

1. In an idler roller assembly, a shaft, a roller body surrounding said shaft and rotatable thereabout, a resilient collar on said shaft adjustable axially thereof towards said roller body, said collar being normally in light contact with said roller body to prevent foreign matter from moving inwardly of said body beyond the area of said contact of said body with said collar, means maintaining said collar in an axially adjusted position relative to said shaft and said roller body, a supporting bracket having a U-shaped slot therein, said collar having a portion in its normal undistorted state slightly greater in width than the width of said slot, said portion being deformable to be accommodated in said slot, and means for applying a force axially of said shaft to press said portion against the bracket when said portion is accommodated within the U-shaped slot.

2. In an idler roller assembly, a shaft, a roller body surrounding said shaft and rotatable thereabout, an end face on the roller body, a resilient collar surrounding said shaft and movable axially thereon, a flange of resilient material carried by said collar movable axially of the shaft with said collar to lightly contact said end face and close any clearance between the roller body and the shaft, means maintaining the collar in its adjusted position relative to said shaft, a supporting bracket having a U-shaped slot therein, said collar having a portion in its normal undistorted state slightly greater than the width of said slot but deformable to be accommodated within said slot, and means for applying force axially of said portion to distort said portion against the bracket within said slot.

3. In an idler roller assembly according to claim 2, wherein the means maintaining the collar in its adjusted position relative to the shaft includes a nut threaded on the shaft and abutting the end of said portion of the collar to distort the portion into engagement with the bracket within the slot.

References Cited by the Examiner

UNITED STATES PATENTS

| | | | |
|---|---|---|---|
| 1,292,799 | 1/19 | Kendall | 308—20 X |
| 1,655,335 | 1/28 | Pfleegor | 308—20 |
| 2,757,988 | 8/56 | Lecourbe | 198—192 X |
| 2,803,416 | 8/57 | Berlien | 85—8.8 X |
| 2,869,710 | 1/59 | Stewart | 198—192 |

FOREIGN PATENTS

| | | |
|---|---|---|
| 138,922 | 10/50 | Australia. |
| 787,984 | 12/57 | Great Britain. |

SAMUEL F. COLEMAN, *Primary Examiner.*

JULIUS E. WEST, ERNEST A. FALLER, Jr.,
*Examiners.*